United States Patent [19]

Takenaka

[11] Patent Number: 4,661,308
[45] Date of Patent: Apr. 28, 1987

[54] REMOTE-CONTROLLED MOBILE INSPECTING AND MONITORING SYSTEM

[75] Inventor: Toshio Takenaka, Hyogo, Japan

[73] Assignee: Mitsubishi Denki Kabushiki Kaisha, Tokyo, Japan

[21] Appl. No.: 617,503

[22] Filed: Jun. 5, 1984

[30] Foreign Application Priority Data

Sep. 16, 1983 [JP] Japan ................... 58-171451

[51] Int. Cl.$^4$ .................... G21C 17/00; H02J 9/06
[52] U.S. Cl. ..................... 376/245; 376/249; 307/66
[58] Field of Search .............. 376/245, 249; 307/66; 320/2, 9

[56] References Cited

U.S. PATENT DOCUMENTS

| | | | |
|---|---|---|---|
| 3,986,095 | 10/1976 | Nakai et al. | 320/2 |
| 4,091,319 | 5/1978 | Nguyen | 320/9 |
| 4,299,656 | 11/1981 | Weber et al. | 376/249 |
| 4,323,788 | 4/1982 | Smith | 307/66 |
| 4,416,846 | 11/1983 | Kastl et al. | 376/249 |
| 4,488,057 | 12/1984 | Clarke | 307/66 |
| 4,507,260 | 3/1985 | Fujimoto et al. | 376/245 |
| 4,518,560 | 5/1985 | Takaku et al. | 376/245 |

FOREIGN PATENT DOCUMENTS 137288 10/1981 Japan .
146194 9/1982 Japan .
59-174790 10/1984 Japan ................... 376/249

OTHER PUBLICATIONS

Tele-Operated Robot for Inspection Inside the PCV, Proc. Conf. of Remon Systems Tech (82), Sadakan et al.

Primary Examiner—Salvatore Cangialosi
Attorney, Agent, or Firm—Bernard, Rothwell & Brown

[57] ABSTRACT

A remote-controlled mobile inspecting and monitoring system comprising a rail laid along an inspection route; power lines provided along the rail; an inspection vehicle carrying inspecting and monitoring equipments and adapted to move along the rail; and a power receiving unit mounted on the inspection vehicle so as to be connected to the power lines, wherein the inspection vehicle carries a battery unit for supplying power to the onboard equipments and a changeover unit for controlling the power receiving unit so as to be connected to or disconnected from the power lines and for opening or closing a power supply circuit for supplying power from the battery unit to the onboard equipments. The changeover unit is capable of selectively connecting either the battery unit or the power receiving unit to the onboard equipments. Thus, the remote-controlled mobile inspecting and monitoring system has a safe and compact inspection vehicle.

8 Claims, 6 Drawing Figures

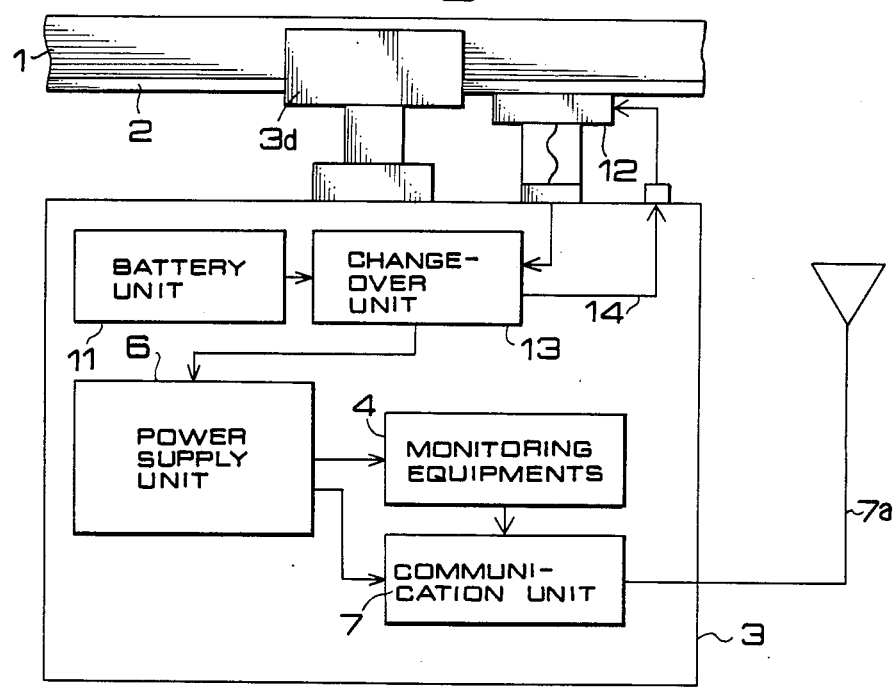
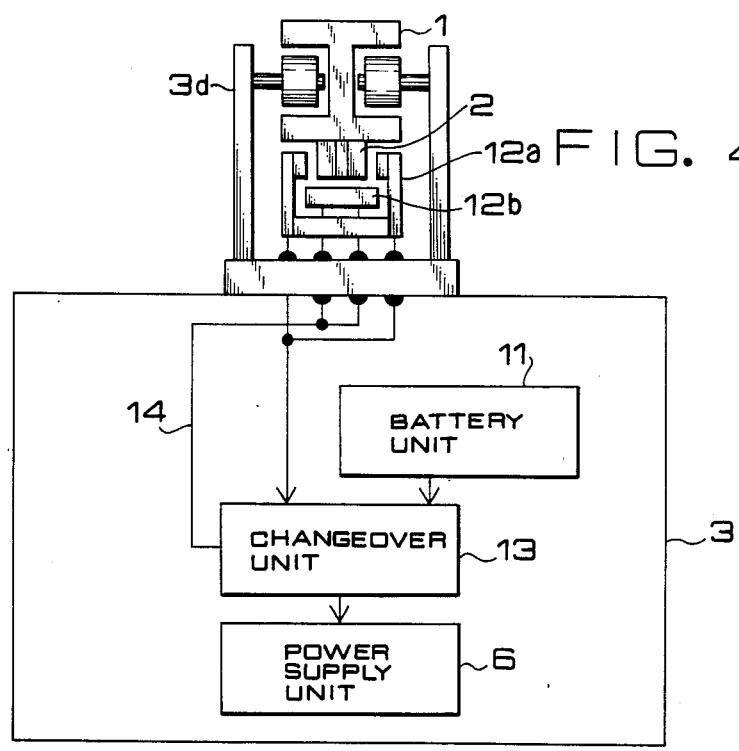

REMOTE-CONTROLLED MOBILE INSPECTING AND MONITORING SYSTEM

BACKGROUND OF THE INVENTION

1. Field of the Invention

The present invention relates to a remote-controlled mobile inspecting and monitoring system and more particularly to a remote-controlled mobile inspecting and monitoring system intended to be used for remote-controlled patrolling checkup works in a plant equipment such as a reactor containment vessel which inhibits the entry of men.

2. Description of the Prior Art

A remote-controlled mobile inspecting and monitoring system of the type as shown in FIG. 1 has been proposed.

Referring to FIG. 1, a power line 2 is extended along a rail 1 and an inspection vehicle 3 is held by a holding mechanism 3d for running along the rail 1. The inspection vehicle 3 carries inspecting and monitoring equipments 4, such as sensors, which are necessary for inspection and monitoring. A current collector shoe 5 is mounted on the inspection vehicle 3 so as to be moved together with the inspection vehicle 3 in sliding contact with the power line 2 to supply power to the inspection vehicle 3. A reference numeral 6 indicates a power supply unit to supply power to the inspecting and monitoring equipments 4. A reference numeral 7 indicates a communication unit for receiving control signals for the telecontrol of the inspection vehicle 3 and for transmitting signals given by the monitoring equipments 4, and 7a indicates an antenna thereof.

The inspecting and monitoring equipments 4 mounted on the inspection vehicle 3 include a television camera for visual inspection, a microphone for acoustic inspection, a dosimeter, a thermometer and a hygrometer.

No driving mechanism for moving the inspection vehicle 3 is shown in FIG. 1. An external driving mechanism designed to pull the inspection vehicle 3 with a chain or an internal driving mechanism integrated with the inspection vehicle 3 for self-moving travel may be employed. In this embodiment, for the convenience of description, it is assumed that the inspection vehicle 3 is driven by a chain type driving mechanism.

FIG. 2 shows, by way of example, a mode of application of a mobile inspecting and monitoring system as shown in FIG. 1 to inspecting and monitoring works in a nuclear power plant. Referring to FIG. 2, there are shown a reactor containment vessel 8, rails 1a, 1b and 1c laid along inspection routes and a central control room 9 located at a place away from the reactor containment vessel 8. A control console 10 for remote-controlling mobile inspecting and monitoring systems in the reactor containment vessel 8 is installed in the central control room 9.

In this system, an operator operates the control console 10 to move the inspection vehicles 3a, 3b and 3c along the predetermined rails 1a, 1b and 1c respectively. The output signals of the inspecting and monitoring equipments 4 mounted on the inspection vehicles 3a, 3b and 3c, namely sensors, are transmitted through the communication unit 7. The conditions of the facilities and equipments installed in the reactor containment vessel 8 are decided on the basis of those output signals of the sensors.

Thus, the operator is allowed to carry out the inspecting and monitoring works remotely from those facilities and equipments without actually patrolling around those facilities and equipments. Accordingly, it is possible to carry out inspecting and monitoring works safely even in a place attended with a danger of being exposed to radioactive rays, such as in a reactor containment vessel.

However, since current collector shoes which slide in contact with power lines have been employed in such a conventional system for supplying power to the equipments mounted on the inspection vehicles, the sliding abrasion of the power lines and the current collector shoes, and the generation of sparks have been the disadvantages of such a conventional system. In using an inspection vehicle in a reactor containment vessel, in particular, the generation of sparks must be reduced to the least possible extent, since it is possible that an explosive gas, such as hydrogen, is generated in a reactor containment vessel. It is possible to provide a battery unit on the inspection vehicle to supply power to the onboard equipments of the inspection vehicle, as a means to solve those problems. However, since those onboard equipments include equipments of large rate of electric power consumption, such as illuminating lamps, a battery unit of a large capacity needs to be provided, which increases the weight and the size of the inspection vehicle disadvantageously.

SUMMARY OF THE INVENTION

Accordingly, it is an object of the present invention to provide a remote-controlled mobile inspecting and monitoring system which is free from those drawbacks of the conventional system.

It is a further object of the present invention to provide a safe remote-controlled mobile inspecting and monitoring system capable of eliminating the generation of sparks and the wear of the power lines and current collector shoes resulting from the relative sliding movement of the power lines and current collector shoes.

Still further object of the present invention is to provide a remote-controlled mobile inspecting and monitoring system capable of reducing the load on the battery unit by receiving power through a contact type power receiving unit from the power lines while the inspection vehicle is stationary so that a battery unit of a reduced capacity is needed, and thereby capable of reducing the size of the inspection vehicle.

Other objects, features and advantages of the present invention will become more apparent from the following description thereof taken in connection with the accompanying drawings.

BRIEF DESCRIPTION OF THE DRAWINGS

FIG. 3 is a schematic illustration showing the general constitution of a preferred embodiment of the remote-controlled mobile inspecting and monitoring system according to the present invention;

FIG. 4 is a schematic illustration showing the general constitution of an embodiment of the present invention employing an electromagnetic contactor in the power receiving unit;

DESCRIPTION OF THE PREFERRED EMBODIMENTS

Figure 1:
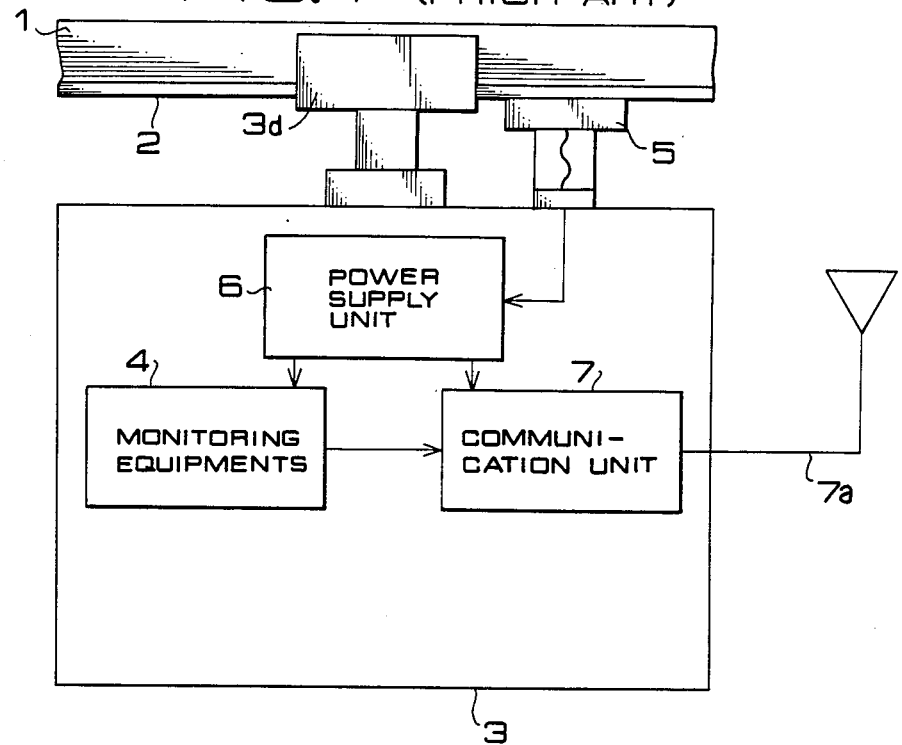
FIG. 1 is a schematic illustration showing the general constitution of a remote-controlled mobile inspecting and monitoring system according to a prior art.
Figure 2:
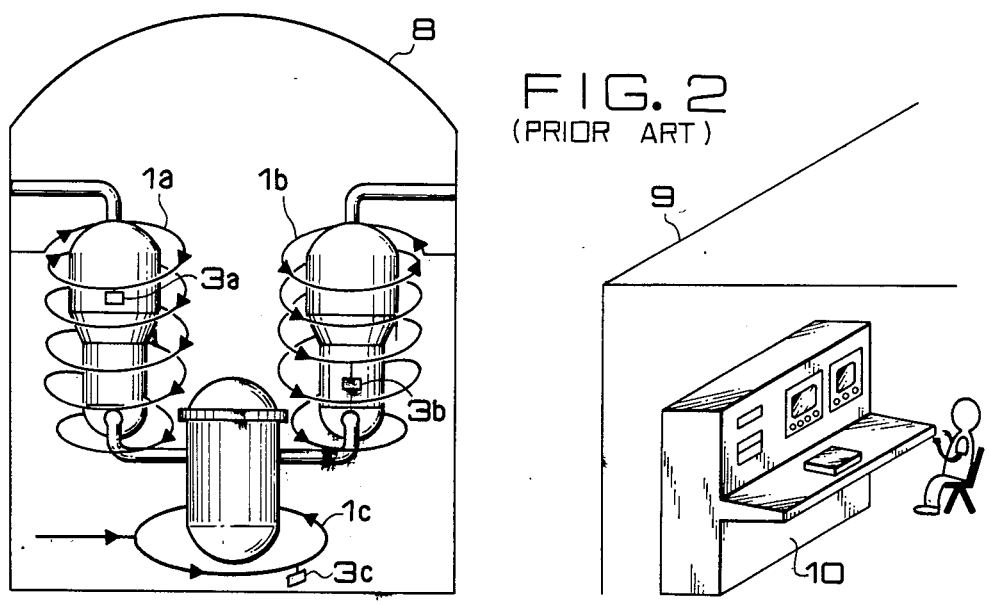
FIG. 2 is a schematic illustration showing, by way of example, a mode of application of the system of FIG. 1 to inspecting and monitoring a reactor containment vessel of a nuclear power plant.

Preferred embodiments of the present invention will be described in detail in connection with FIGS. 3 to 6. In FIGS. 1 through 6, like reference numerals indicate like or corresponding parts.

FIG. 3 is a schematic illustration showing the general constitution of a remote-controlled mobile inspecting and monitoring system embodying the present invention. In FIG. 3, a reference numeral 11 indicates a battery unit and a reference numeral 12 indicates a power receiving unit capable of being connected to or disconnected from power lines 2 discretionally. An inspection vehicle 3 has an onboard changeover unit 13 for connecting a power supply unit 6 selectively to the battery unit 11 or to the power receiving unit 12 and for controlling the connection of the power receiving unit 12 and the power lines 2 by applying control signals to the power receiving unit 12.

The manner of operation of the above-mentioned system will be described hereinafter. First, the condition of the inspection vehicle 3, namely, whether the inspection vehicle 3 is running or stopping, is detected by a command given by the control console 10 or by a sensor included in the inspecting and monitoring equipments 4. Then, the changeover unit 13 is controlled on the basis of the result of the detection. If the inspection vehicle 3 is running, the changeover unit 13 disconnects the power receiving unit 12 from the power lines 2 and connects the battery unit 11 to the power supply unit 6 to supply power to the power supply unit 6 by the battery unit 11. If the inspection vehicle 3 is stationary, the battery unit 11 is disconnected from the power supply unit 6 and the power receiving unit 12 is connected to the power supply unit 6. At the same time, the changeover unit 13 gives a control signal, which is transmitted through the signal line 14 to the power receiving unit 12 to make the power receiving unit contact with the power lines 2 so that power is supplied to the power supply unit 6 through the power receiving unit 12 by the power lines 2. In practical inspecting and monitoring works, several measuring points are determined on inspection routes defined, for example, by the rails 1a, 1b and 1c of FIG. 2. Generally, the inspection vehicles 3 are stopped at the measuring points for inspection works and inspection and monitoring works are performed rarely while the inspection vehicle 3 are moving. Accordingly, the possibility of supplying power through the power receiving unit by an external power source reduces the load on the battery unit remarkably.

Figure 5:
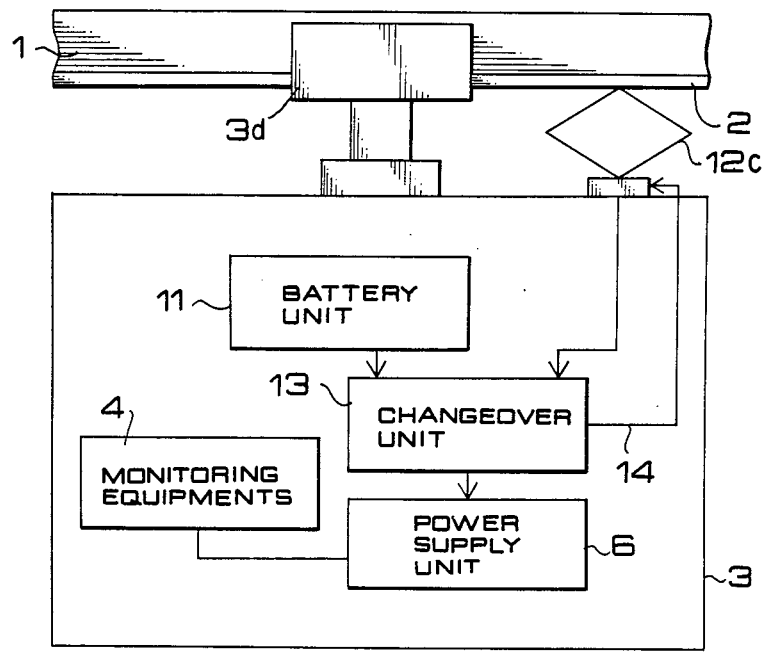
FIG. 5 is a schematic illustration showing the general constitution of an embodiment of the present invention employing a pantograph collector in the power receiving unit.

Exemplary constitutions of the power receiving unit 12 are shown in FIGS. 4 and 5. FIG. 4 is a schematic illustration of a power receiving unit 12 of a system according to the present invention, employing an electromagnetic contactor. In FIG. 4, a reference numeral 12a indicates contacts of the electromagnetic contactor and a reference numeral 12b indicates the solenoid of the electromagnetic contactor adapted to be energized by a signal given through the signal line 14 by the changeover unit 13 when the inspection vehicle 3 is stopped. When energized, the solenoid attracts the contacts 12a so that the contacts 12a are brought into contact with the power lines 2. While the solenoid 12b is not energized, the contacts 12a are separated from the power lines 2 by a mechanism not shown. The power receiving unit 12 thus has the electromagnetic contactor consisting of the solenoid 12b and the contacts 12a. Accordingly, a signal is transmitted from the changeover unit 13 through the signal line 14 to the power receiving unit 12 at an optional position where the inspection vehicle stops to energize the solenoid 12b so that the contacts 12a are brought into contact with the power lines 2, and thereby power is supplied from the power lines 2 to the inspection vehicle 3. In this embodiment, as the contacts 12a clamp the power lines 2 from opposite sides, the contacts 12a function also as members to restrict the swing motion of the inspection vehicle 3 while the inspection vehicle is stationary.

FIG. 5 is a schematic illustration showing the constitution of the power receiving unit 12 employing a pantograph 12c. The pantograph 12c is expanded or contracted by control signals given by the changeover unit 13 and transmitted through the signal line 14 to the power receiving unit 12 so that the pantograph 12c can optionally be brought into contact with the power lines 2.

Figure 6:
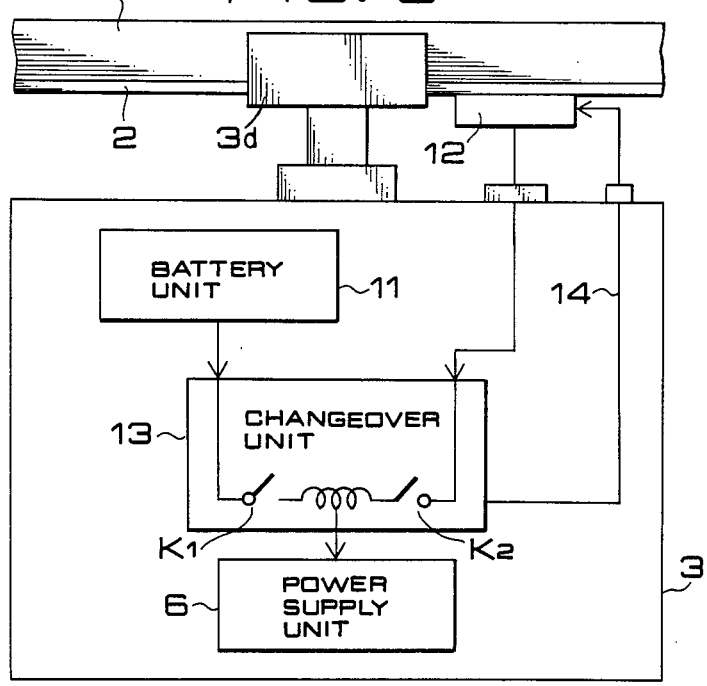
FIG. 6 is a schematic illustration showing the general constitution of a change-over device employed in an embodiment of the present invention.

FIG. 6 is a schematic illustration showing an example of the constitution of the changeover unit 13 according to the present invention, in which a switch $K_1$ which is closed while the inspection vehicle 3 is running and is open while the same is stationary, and a switch $K_2$ is open while the inspection vehicle 3 is running and is closed while the same is stationary. While the inspection vehicle is running, the switch $K_2$ is open, the power receiving unit 12 is disconnected from the power lines 2 and the switch $K_1$ is closed to supply power to the power supply unit 6 only by the battery unit 11. On the other hand, while the inspection vehicle is stationary, the switch $K_1$ is open, the switch $K_2$ is closed and the power receiving unit 12 is connected to the power supply lines 2 to supply power from the power lines 2 to the power supply unit 6. The switches $K_1$ and $K_2$ are controlled so that the power receiving unit 12 is connected to or disconnected from the power lines 2 with the switch $K_2$ of the changeover unit 13 open, namely, the switch $K_2$ is opened before the power receiving unit 12 is disconnected from the power lines 2 and the switch $K_2$ is closed after the power receiving unit 12 has been connected to the power lines 2, which prevents the generation of sparks in connecting the power receiving unit 12 to or in disconnecting the same from the power line 2. Furthermore, it is also possible to charge the batteries of the battery unit during the inspectior works by closing the switch $K_1$ while the inspectior vehicle is stopped and power is supplied from the power lines 2.

The present invention has been described hereinbefore with reference to the preferred embodiments thereof as applied to a remote-controlled mobile inspecting and monitoring system employing a chain drive system for driving the inspection vehicle 3, however, the application of the present invention is not limited to those embodiments, but the present invention is applicable to a remote-controlled mobile inspecting and monitoring system including an inspection vehicle of the self-moving type having an onboard driving mechanisms.

The inspection vehicle 3 is not necessarily of the type that is supported directly on and moves along the rail 1, but may be an inspection vehicle of the type that is guided by a guide rail and moves on the floor. Furthermore, naturally, the inspection vehicle is applicable not only to inspecting and monitoring works in a reactor containment vessel of a nuclear power plant, but also to general inspecting and monitoring works.

As has been described hereinbefore, according to the present invention, power is supplied by a battery unit while the inspection vehicle is moving and by an external power source through the power receiving unit capable of being connected to or disconnected from the external power source optionally while the inspection vehicle is stationary. Consequently, the wear of the power lines and the current collector resulting from the relative sliding movement thereof and the generation of sparks are prevented and the size of the battery unit is reduced, and thereby the size of the inspection vehicle carrying the battery unit is reduced.

What is claimed is:

1. A remote-controlled mobile inspecting and monitoring system comprising:
    (a) a rail laid along a predetermined inspection route;
    (b) power lines provided along the rail;
    (c) an inspection vehicle carrying onboard equipment including inspecting and monitoring equipment and adapted to move along the rail;
    (d) a power receiving unit mounted on the inspection vehicle and capable of being connected to or disconnected from the power lines;
    (e) a battery unit mounted on the inspection vehicle, for supplying power to the inspecting and monitoring equipment; and
    (f) a changeover unit for controlling the power receiving unit so as to be connected to or disconnected from the power lines and for opening or closing a power circuit connecting the battery unit and the onboard equipment;
    (g) said changeover unit disconnecting the power receiving unit from the power lines while the inspection vehicle is moving and connecting the power receiving unit to the power lines while the inspection vehicle is stationary.

2. A remote-controlled mobile inspecting and monitoring system according to claim 1, wherein said changeover unit closes or opens the power supply circuit connecting the battery unit to the onboard equipment while the inspection vehicle is moving or stationary respectively.

3. A remote-controlled mobile inspecting and monitoring system according to claim 1, wherein said power receiving unit is an electromagnetic contactor having a solenoid and contacts which are brought into contact with the power lines when the solenoid is energized.

4. A remote-controlled mobile inspecting and monitoring system according to claim 3, wherein the contacts of the electromagnetic contactor serving as the power receiving unit holds the power lines therebetween, and thereby the contacts function as a mechanism to restrict the swing motion of the inspection vehicle while the same is stationary.

5. A remote-controlled mobile inspecting and monitoring system according to claim 1, wherein said power receiving unit employs a pantograph collector.

6. A remote-controlled mobile inspecting and monitoring system according to claim 1, wherein a switch is provided in the power supply circuit connecting the power receiving unit to the onboard equipment and the switch is closed after the power receiving unit has been connected to the power lines and is opened before the power receiving unit is disconnected from the power lines.

7. A remote-controlled mobile inspecting and monitoring system according to claim 1, wherein the power supply circuit connecting the power receiving unit to the onboard equipment is connected also to a battery charging circuit while the inspection vehicle is stationary, to charge the batteries of the battery unit.

8. A remote-controlled mobile inspecting and monitoring system according to claim 1, wherein said rail is laid in a nuclear power plant and said inspection vehicle carries various sensors, such as a television camera, a microphone, a thermometer, a hygrometer and a dosimeter, for the remote-controlled inspection and monitoring of an atomic energy plant.

* * * * *